US009799880B2

(12) United States Patent
Schroedle et al.

(10) Patent No.: US 9,799,880 B2
(45) Date of Patent: Oct. 24, 2017

(54) SPHERICAL PARTICLES, PRODUCTION THEREOF AND USE

(71) Applicant: BASF SE, Ludwigshafen (DE)

(72) Inventors: Simon Schroedle, Westfield, NJ (US); Martin Schulz-Dobrick, Mannheim (DE)

(73) Assignee: BASF SE, Ludwigshafen (DE)

( * ) Notice: Subject to any disclaimer, the term of this patent is extended or adjusted under 35 U.S.C. 154(b) by 3 days.

(21) Appl. No.: 14/889,602

(22) PCT Filed: Apr. 28, 2014

(86) PCT No.: PCT/EP2014/058548
§ 371 (c)(1),
(2) Date: Nov. 6, 2015

(87) PCT Pub. No.: WO2014/180686
PCT Pub. Date: Nov. 13, 2014

(65) Prior Publication Data
US 2016/0093881 A1 Mar. 31, 2016

(30) Foreign Application Priority Data
May 8, 2013 (EP) .................................... 13167000

(51) Int. Cl.
*H01M 4/36* (2006.01)
*H01M 4/485* (2010.01)
(Continued)

(52) U.S. Cl.
CPC .......... *H01M 4/366* (2013.01); *C01G 53/006* (2013.01); *C01G 53/44* (2013.01); *H01M 4/485* (2013.01);
(Continued)

(58) Field of Classification Search
CPC ...... H01M 4/366; H01M 4/485; H01M 4/505; H01M 4/525; C01G 53/006; C01G 53/44
See application file for complete search history.

(56) References Cited

U.S. PATENT DOCUMENTS

2011/0049420 A1 3/2011 Ellenwood et al.
2012/0068108 A1 3/2012 Schulz-Dobrick et al.
(Continued)

FOREIGN PATENT DOCUMENTS

EP 2 238 636 A1 10/2010
WO WO 2009/074311 A1 6/2009

OTHER PUBLICATIONS

U.S. Appl. No. 14/889,577, filed Nov. 6, 2015, Simon Schroedle, et al.
(Continued)

*Primary Examiner* — Stewart Fraser
(74) *Attorney, Agent, or Firm* — Oblon, McClelland, Maier & Neustadt, L.L.P.

(57) ABSTRACT

Spherical particles comprising
(A) at least one mixed transition metal hydroxide or mixed transition metal carbonate of at least 3 different transition metals selected from nickel, cobalt, manganese, iron, chromium and vanadium,
(B) at least one fluoride, oxide or hydroxide of Ba, Al, Zr or Ti,
where the transition metals in transition metal hydroxide (A) or transition metal carbonate (A) are predominantly in the +2 oxidation state,
where fluoride (B) or oxide (B) or hydroxide (B) is present to an extent of at least 75% in an outer shell of the spherical particles in the form of domains and is encased to an extent of at least 90% by transition metal hydroxide (A) or transition metal carbonate (A).

14 Claims, 1 Drawing Sheet

Aluminum-selective analysis of precursor according to Example. I.1.

(51) Int. Cl.
*H01M 4/505* (2010.01)
*H01M 4/525* (2010.01)
*C01G 53/00* (2006.01)
*H01M 10/0525* (2010.01)

(52) U.S. Cl.
CPC .......... *H01M 4/505* (2013.01); *H01M 4/525* (2013.01); *H01M 10/0525* (2013.01); *C01P 2004/50* (2013.01); *C01P 2004/52* (2013.01); *C01P 2004/61* (2013.01); *C01P 2004/80* (2013.01); *C01P 2004/82* (2013.01); *C01P 2006/11* (2013.01); *H01M 2220/20* (2013.01); *H01M 2220/30* (2013.01)

(56) References Cited

U.S. PATENT DOCUMENTS

| | | | |
|---|---|---|---|
| 2012/0080649 | A1 | 4/2012 | Koenig, Jr. et al. |
| 2013/0189578 | A1* | 7/2013 | Oh ................. H01M 4/131 429/211 |
| 2014/0170493 | A1* | 6/2014 | Holme ............... H01M 4/04 429/220 |

OTHER PUBLICATIONS

U.S. Appl. No. 14/889,663, filed Nov. 6, 2015, Simon Schroedle, et al.
U.S. Appl. No. 14/889,928, filed Nov. 9, 2015, Simon Schroedle, et al.
International Search Report issued Jun. 18, 2014 in PCT/EP2014/058548 (with English language translation).
Youyuan Huang, et al., "A modified $Al_2O_3$ coating process to enhance the electrochemical performance of $Li(Ni_{1/3}Co_{1/3}Mn_{1/3})O_2$ and its comparison with traditional $Al_2O_3$ coating process" Journal of Power Sources, vol. 195, No. 24, XP02/253004, Dec. 15, 2010, pp. 8267-8274.
Gary M. Koenig, Jr., et al., "Composition-Tailored Synthesis of Gradient Transition Metal Precursor Particles for Lithium-Ion Battery Cathode Materials" Chemistry of Materials, vol. 23, 2011, pp. 1954-1963.
K.K. Cheralathan, et al., "Preparation of spherical $LiNi_{0.80}Co_{0.15}Mn_{0.05}O_2$ lithium-ion cathode material by continuous co-precipitation" Journal of Power Sources, vol. 195, 2010, pp. 1486-1494.
Zhenlei Huang, et al., "Well-ordered spherical $LiNi_xCo_{(1-2x)}Mn_xO_2$ cathode materials synthesized from cobolt concentration-gradient precursors" Journal of Power Sources, vol. 202, 2012, pp. 284-290.
Yang-Kook Sun, et al., "A novel concentration-gradient $Li[Ni_{0.83}Co_{0.07}Mn_{0.10}]O_2$ cathode material for high-energy lithium-ion batteries" Journal of Materials Chemistry, vol. 21, 2011, pp. 10108-10112.
Yang-Kook Sun, et al., "A Novel Cathode Material with a Concentration-Gradient for High-Energy and Safe Lithium-Ion Batteries" Advanced Functional Materials, vol. 20, 2010, pp. 485-491.
Yang-Kook Sun, et al., "High-voltage performance of concentration-gradient $Li[Ni_{0.67}Co_{0.15}Mn_{0.18}]O_2$ cathode material for lithium-ion batteries" Electrochimica Acta, vol. 55, 2010, pp. 8621-8627.
Yang-Kook Sun, et al., "High-energy cathode material for long-life and safe lithium batteries" Nature Materials, vol. 8, Apr. 2009, pp. 320-324.
Gu Da-Ming, et al., "Electrochemical Performance of $LiCoO_2$ Gradient Coated $LiNi_{0.96}Co_{0.04}O_2$ Cathode" Chinese Journal of Inorganic Chemistry, vol. 21, No. 5, May 2005, pp. 725-728 (with English Abstract).
Zonghai Chen, et al., "Advanced cathode materials for lithium-ion batteries" MRS Bulletin, vol. 36, Jul. 2011, pp. 498-505.

* cited by examiner

Aluminum-selective analysis of precursor according to Example. I.1.
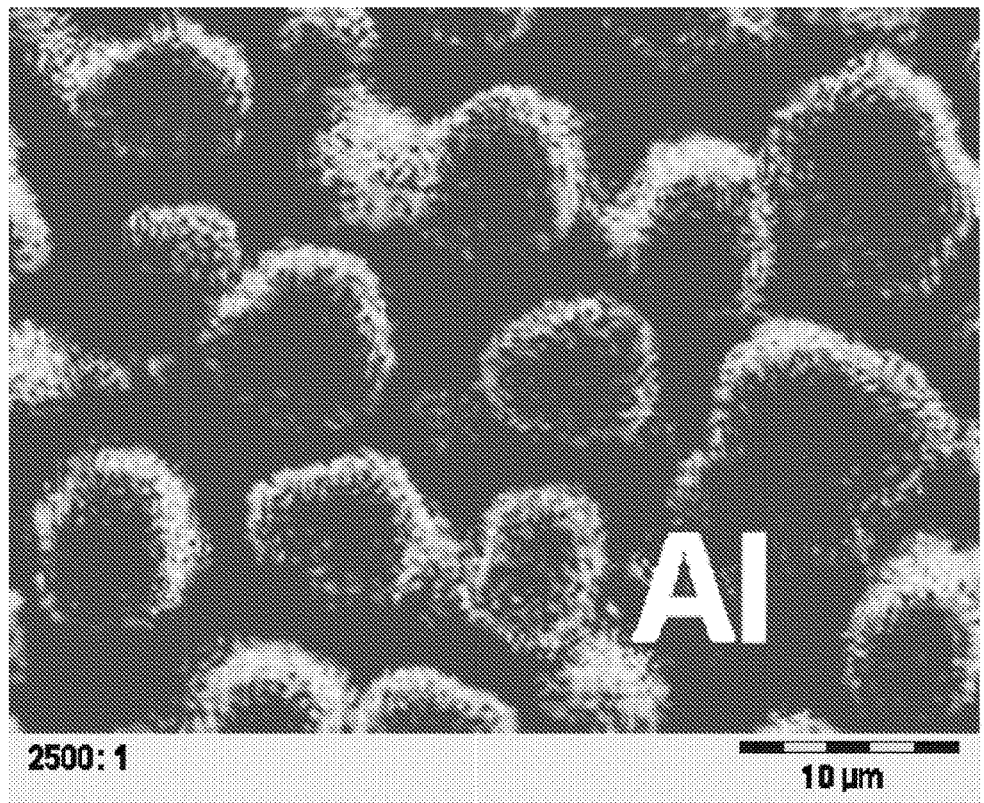

SPHERICAL PARTICLES, PRODUCTION THEREOF AND USE

The present invention relates to spherical particles comprising
- (A) at least one mixed transition metal hydroxide or mixed transition metal carbonate of at least 3 different transition metals selected from nickel, cobalt, manganese, iron, chromium and vanadium,
- (B) at least one fluoride, oxide or hydroxide of Ba, Al, Zr or Ti, where the transition metals in transition metal hydroxide (A) or transition metal carbonate (A) are predominantly in the +2 oxidation state,
where fluoride (B) or oxide (B) or hydroxide (B) is present to an extent of at least 75% in an outer shell of the spherical particles in the form of domains and is encased to an extent of at least 90% by transition metal hydroxide (A) or transition metal carbonate (A).

Storing energy has long been a subject of growing interest. Electrochemical cells, for example batteries or accumulators, can serve to store electrical energy. As of recently, lithium ion batteries have been the subject of particular interest. They are superior to the conventional batteries in some technical aspects. For instance, they can be used to generate voltages unobtainable with batteries based on aqueous electrolytes.

In lithium ion batteries, an important role is played by the materials from which the electrodes are made, and more particularly the material from which the cathode is made.

In many cases, the active materials used are lithium-containing mixed transition metal oxides, especially lithium-containing nickel-cobalt-manganese oxides.

Problems arise in many batteries as a result of inadequate cycling stability, lifetime and reliability, especially with regard to short circuits, in the event of mechanical damage to the battery or in the event of excessive thermal stress, and each of these still has to be improved.

In order to solve such problems, lithium-containing nickel-cobalt-manganese oxides doped with one or more metals, for example with Ba, Zr, Al or Ti, are used; see, for example EP 2 238 636. Such doped lithium-containing mixed transition metal oxides are typically made in a multistage process, wherein a sparingly soluble compound or a mixture of a plurality of sparingly soluble compounds, each also referred to as precursors, is first precipitated from one or more solutions of transition metal salts. This precursor is treated thermally in a second stage, usually in the range from 600 to 1000° C. The properties of the precursor have a strong influence on the properties of the active material. The precursor can subsequently be coated with small amounts of compounds of Ba, Ti, Al or Zr, so as to obtain a precursor coated on the outer surface. In another variant, the procedure is to mix the solution of transition metal salts with a soluble compound of Ba, Ti, Al or Zr and to precipitate the metals added together with the transition metals.

However, a disadvantage is that coating with the frequently electrically nonconductive compounds such as $Al_2O_3$, $TiO_2$ or BaO distinctly reduces the power load capability of the battery. It is also observed that coated cathode materials in some cases allow poorer connection of the particles to the output conductor. A further disadvantage is that coatings can become detached from the remainder of the battery material as a result of aging phenomena.

WO 2009/074311 discloses a process for producing precursors for battery materials, in which a dispersion of titanium dioxide is added continuously during the precipitation of mixed nickel-cobalt-manganese hydroxide. A disadvantage of the disclosed process is that titanium dioxide particles which can have an adverse effect on the current durability of the battery are found in the battery material in many cases.

The problem addressed was thus that of providing cathode materials for lithium ion batteries which firstly have improved reliability, especially with regard to short circuits, in the event of mechanical damage to the battery or in the event of excessive thermal stress, but without having to accept disadvantages with regard to power load capability on the other hand. A further problem addressed was that of providing a process for producing cathode materials for lithium ion batteries, these firstly having improved reliability without having to accept disadvantages in terms of power load capability.

It has been found that the precursor of the cathode material has a crucial influence on the cathode material. Accordingly, the precursors defined at the outset have been found, these being obtained in the form of spherical particles and also being referred to in the context of the present invention as inventive spherical particles or else as inventive particles for short.

BRIEF DESCRIPTION OF DRAWINGS

The figure shows an aluminum-selective analysis of precursor according to Example I.1.

Inventive spherical particles comprise
- (A) at least one mixed transition metal hydroxide, also called transition metal hydroxide (A) for short in the context of the present invention, or at least one mixed transition metal carbonate, also called transition metal carbonate (A) for short in the context of the present invention, each of at least 3 different transition metals selected from nickel, cobalt, manganese, iron, chromium and vanadium,
- (B) at least one fluoride, oxide or hydroxide of Ba, Al, Zr or Ti, where the transition metals in transition metal hydroxide (A) or transition metal carbonate (A) are predominantly in the +2 oxidation state,
where fluoride (B) or oxide (B) or hydroxide (B) is present to an extent of at least 75% in an outer shell of the spherical particles in the form of domains and is encased to an extent of at least 90% by transition metal hydroxide (A) or transition metal carbonate (A).

Inventive particles have a spherical shape. Spherical particles shall include not just those which are exactly spherical but also those particles in which the maximum and minimum diameter of at least 95% (number average) of a representative sample differ by not more than 5%.

Transition metal hydroxide (A) is a hydroxide of at least 3 different transition metals selected from nickel, cobalt, manganese, iron, chromium and vanadium, preferably a mixed hydroxide of nickel, manganese and cobalt. "Hydroxide of at least 3 different transition metals" shall be understood to mean those proportions which are present not just as traces in inventive particles but in proportions of at least 1% by weight, based on the total transition metal content of the particles in question, preferably in proportions of at least 2% by weight and more preferably in proportions of at least 5% by weight.

Transition metal hydroxide (A) may include traces of other metal ions, for example traces of ubiquitous metals such as sodium, but these will not be taken into account in the description.

Transition metal hydroxide (A) may, as well as hydroxide, comprise counterions other than hydroxide, for example carbonate, sulfate, nitrate, carboxylate, especially acetate, or halide, especially chloride. A particularly preferred counterion, apart from hydroxide, is oxide, especially in combination with sulfate. It is possible for carbonate, sulfate, carboxylate or halide to be present in traces in mixed transition metal hydroxide (A), for example of up to 1% by weight, based on hydroxide. Oxide may be present in greater proportions in mixed transition metal hydroxide (A); for example, every second anion may be a hydroxide ion and every second an oxide ion.

Transition metal carbonate (A) is a carbonate of at least 3 different transition metals selected from nickel, cobalt, manganese, iron, chromium and vanadium, preferably a mixed carbonate of nickel, manganese and cobalt. "Carbonate of at least 3 different transition metals" shall be understood to mean those proportions which are present not just as traces in inventive particles but in proportions of at least 1% by weight, based on the total transition metal content of the particles in question, preferably in proportions of at least 2% by weight and more preferably in proportions of at least 5% by weight.

Transition metal carbonate (A) may include traces of other metal ions, for example traces of ubiquitous metals such as sodium, but these will not be taken into account in the description.

Transition metal carbonate (A) may, as well as carbonate, comprise counterions other than carbonate, for example hydroxide, sulfate, nitrate, carboxylate, especially acetate, or halide, especially chloride. Particularly preferred counterions, apart from carbonate, are oxide and hydroxide, especially in combination with sulfate. It is possible for hydroxide, sulfate, carboxylate or halide to be present in traces in mixed transition metal carbonate (A), for example of up to 1% by weight, based on carbonate. Oxide may be present in greater proportions in mixed transition metal carbonate (A); for example, not more than every third anion may be an oxide ion, for example not more than every tenth.

Transition metal hydroxide (A) or transition metal carbonate (A) may comprise up to 20 mol % of magnesium hydroxide or magnesium carbonate, based on the cations. In another embodiment of the present invention, transition metal hydroxide (A) or transition metal carbonate (A) does not comprise any magnesium.

Inventive particles may have a median diameter (D50) in the range from 0.1 to 35 µm, preferably 2 to 30 µm, for example measured by light scattering. Suitable instruments are commercially available, for example Malvern Mastersizer.

The width of the particle diameter distribution is preferably narrow. In one embodiment of the present invention, for inventive particles, (D10)≥3 µm and (D90)<30 µm. In a specific embodiment of the present invention, in addition, 3·(D10)≥(D50) and (D90)≤2·(D50). More preferably, 2·(D10)≥(D50) and (D90)≤1.5·(D50).

The transition metals in transition metal hydroxide (A) or transition metal carbonate (A) are predominantly in the +2 oxidation state. This shall be understood to mean that at least 50 mol % of the transition metals in transition metal hydroxide (A) or transition metal carbonate (A) selected from nickel, cobalt, manganese, iron, chromium and vanadium are in the +2 oxidation state, and not more than 50 mol %, preferably not more than 40 mol %, may be in the +3 or +4 oxidation state. The oxidation state can be determined, for example, by redox titration. In a specific embodiment of the present invention, all transition metals in transition metal hydroxide (A) or transition metal carbonate (A) are in the +2 oxidation state, where the transition metals in question are selected from nickel, cobalt and manganese.

In one embodiment of the present invention, all transition metals in transition metal hydroxide (A) or transition metal carbonate (A) are in the +2 oxidation state.

In one embodiment of the present invention, 1 to 40 mol % of the manganese in transition metal hydroxide (A) or transition metal carbonate (A) is in the +4 oxidation state and the rest of the manganese in the +2 oxidation state.

In one embodiment of the present invention, 1 to 40 mol % of the cobalt in transition metal hydroxide (A) or transition metal carbonate (A) is in the +3 oxidation state and the rest of the cobalt in the +2 oxidation state.

Preferably, nickel is exclusively in the +2 oxidation state.

Inventive particles further comprise (B) at least one fluoride, oxide or hydroxide of Ba, Al, Zr or Ti, also referred to as fluoride (B), oxide (B) or hydroxide (B) in the context of the present invention. Examples of fluoride (B) are $AlF_3$, $BaF_2$, $ZrF_4$ and $TiF_4$. Examples of oxides (B) are BaO, $Al_2O_3$, $ZrO_2$ and $TiO_2$, and also $BaTiO_3$ and $BaZrO_3$. Examples of hydroxides are those with a defined formula, for example $Ba(OH)_2$, but also water-containing oxides such as $Al_2O_3$.aq, $TiO_2$.aq and $ZrO_2$.aq, and basic hydroxides, for example AlOOH. Preferred oxides (B) or hydroxides (B) are selected from $BaTiO_3$, $Al_2O_3$ and $TiO_2$.

In inventive particles, fluoride (B) and/or oxide (B) and/or hydroxide (B) are present to an extent of at least 75%, preferably to an extent of at least 90% and more preferably completely in an outer shell of the spherical particles in the form of domains and are encased to an extent of at least 90% by transition metal hydroxide (A) or transition metal carbonate (A).

Domains are understood to mean those regions of inventive particles in which the content of fluoride (B), oxide (B) or hydroxide (B) is at least 20 mol % higher than in the rest of the particle in question. In a specific embodiment of the present invention, exclusively fluoride (B), oxide (B) or hydroxide (B) is present in domains.

Not more than 25%, preferably up to 10% and more preferably no measurable proportions of fluoride (B) or oxide (B) or hydroxide (B) are localized in the core of inventive particles.

Domains may have a diameter in the range from 10 nm up to 1 µm and have spherical, egg-shaped or irregular shape. Domains may have a crystalline or amorphous structure.

In connection with domains, "encased to an extent of at least 90% by transition metal hydroxide (A) or transition metal carbonate (A)" is understood to mean that at least 90% of the fluoride (B) or oxide (B) or hydroxide (B) in question is encased by transition metal hydroxide (A) or transition metal carbonate (A), and not more than 10% of the fluoride (B) or oxide (B) or hydroxide (B) is at the outermost surface of the inventive particle in question.

The core and outer shell of inventive particles may have different diameters. The diameter of the core should preferably include at least 50% of the inventive particle in question. In a preferred embodiment of the present invention, the outer shell has a mean thickness of 1 to 15%, based on the diameter of the respective particle.

Domains, the composition thereof and the thickness thereof can be determined, for example, by electron microscopy studies, for example by scanning electron microscopy.

In one embodiment of the present invention, the proportion of fluoride (B) or oxide (B) or hydroxide (B) is in the range from 0.3 to 5% by weight, based on transition metal hydroxide (A) or transition metal carbonate (A).

In one embodiment of the present invention, mixed transition metal hydroxide (A) corresponds to the general formula (I)

in which the variables are each defined as follows:
M is Mg and/or one or more transition metals selected from Fe, Cr and V
a is in the range from 0.1 to 0.8, preferably 0.5 to 0.65,
b is in the range from 0.07 to 0.4, preferably 0.15 to 0.25,
c is in the range from 0.07 to 0.6, preferably 0.15 to 0.25,
d is in the range from zero to 0.2, preferably to 0.05,
where: a+b+c+d=1,
e is in the range from 0.05 to 0.5, preferably to 0.4,
f is in the range from 0.5 to 1.9, preferably at least 1.2,
and the mean oxidation state of Ni, Co and Mn is in the range from 2.1 to 3.2.

The mean oxidation state of Ni, Co and Mn is understood to mean the oxidation state averaged over all transition metals in the inventive particle in question.

For example, when e=0.5 and f=1.5, the mean oxidation state of Ni, Co and Mn is 2.5 and, when e=0.5 and f=1.9, the mean oxidation state of Ni, Co and Mn is 2.9.

In one embodiment of the present invention, mixed transition metal carbonate (A) corresponds to the general formula (II)

in which the variables are each defined as follows:
M is Mg and/or one or more transition metals selected from Fe, Cr and V,
a' is in the range from 0.1 to 0.5, preferably 0.2 to 0.3,
b' is in the range from zero to 0.3, preferably zero to 0.15,
c' is in the range from 0.1 to 0.75, preferably 0.45 to 0.75,
d' is in the range from zero to 0.2, preferably zero to 0.05,
where: a'+b'+c'+d'=1,
e' is in the range from zero to 0.6,
h is in the range from 0.4 to 1,
j is in the range from zero to 0.3.

In one embodiment of the present invention, inventive particles are of homogeneous composition with respect to the transition metals nickel, cobalt, manganese, chromium, vanadium and iron, meaning that there is no change in the relative composition over the cross section of the particle in question. In another embodiment of the present invention, inventive particles of a sample are of inhomogeneous composition, in which case the mean standard deviation of the composition of nickel, cobalt, manganese, chromium, vanadium and iron, preferably that of nickel, cobalt and manganese, is up to 10 mol % in each case. In a specific embodiment, inventive particles are of inhomogeneous composition, the particles consisting of primary particles which are in turn of inhomogeneous composition, in which case the mean standard deviation of the composition of nickel, cobalt, manganese, chromium, vanadium and iron, preferably that of nickel, cobalt and manganese, is up to 10 mol % in each case, but the various particles of a sample may be of essentially identical composition.

The present invention further provides a process for producing inventive particles, also called inventive production process in the context of the present invention.

In one embodiment of the present invention, the procedure is as follows:

(a) first of all, particles of transition metal hydroxide (A) or transition metal carbonate (A) are produced,
(b) fluoride (B) or oxide (B) or hydroxide (B) or a solution comprising a salt of Ba, Al, Zr or Ti and optionally a water-soluble fluoride is contacted with particles according to step (a), at a different time or place from step (a),
(c) further transition metal hydroxide (A) or transition metal carbonate (A) is produced during step (c) and the transition metal hydroxide (A) or transition metal carbonate (A) thus obtainable is combined with the particles from step (b),
where the steps (b) and (c) may run simultaneously or consecutively.

In step (b), it is possible to proceed from fluoride (B) or oxide (B) or hydroxide (B), or fluoride (B) or oxide (B) or hydroxide (B) is produced in situ.

By the contacting in step (b), fluoride (B) or oxide (B) or hydroxide (B) is applied to particles according to step (a).

In the embodiments in which a solution comprising a water-soluble salt of Ba, Al, Zr or Ti or optionally a water-soluble fluoride is used, the type of solution is chosen in such a way that water-insoluble compounds selected from hydroxides, oxides and fluorides of Ba, Al, Zr and Ti precipitate out at least in part under the reaction conditions of step (b). These water-insoluble compounds separate out on particles according to step (a) under the reaction conditions of step (b).

Inventive particles can be produced in batchwise or continuous procedures. It is preferable to produce inventive particles by precipitation from aqueous solutions.

Semicontinuous processes are also conceivable.

If it is desirable to produce inventive particles batchwise, the procedure may be, for example, to first produce transition metal hydroxide (A) or transition metal carbonate (A) in a stirred vessel, specifically in the form of particles having a lower mean diameter than inventive particles, step (a). The particles thus formed are generally obtained as a suspension. Then particles of oxide (B), fluoride (B) or hydroxide (B) are added to the suspension thus formed, or soluble compounds of titanium, zirconium, barium or aluminum are added, and optionally a further precipitating reagent, for example a water-soluble fluoride, step (b). Simultaneously or thereafter, further transition metal hydroxide (A) or transition metal carbonate (A) is produced, for example by further precipitating or again precipitating transition metal hydroxide (A) or transition metal carbonate (A), step (c).

Specifically, it is possible to proceed, for example, as follows. In a stirred vessel, aqueous solution(s) of salts of at least 3 different transition metals selected from nickel, cobalt, manganese, iron, chromium and vanadium, for example as the halide, nitrate, carboxylate, especially acetate, or most preferably as the sulfate, are combined with at least one precipitating reagent, for example at least one alkali metal hydroxide or alkali metal carbonate or ammonium carbonate, and transition metal hydroxide (A) or transition metal carbonate (A) is precipitated, step (a). Thereafter, fluoride (B), hydroxide (B) or oxide (B) is added in the form of particles or in the form of a suspension, step (b), and additionally aqueous solution of halides, nitrates, carboxylates, especially acetates, or most preferably sulfates, of the transition metals in question, nickel, cobalt, manganese, iron, chromium and/or vanadium, and further precipitating reagent, step (c).

In another specific embodiment, it is possible to proceed as follows. In a stirred vessel, aqueous solution(s) of salts of at least 3 different transition metals selected from nickel, cobalt, manganese, iron, chromium and vanadium, for example as the halide, nitrate, carboxylate, especially acetate, or most preferably as the sulfate, are combined with at least one precipitating reagent, for example at least one alkali metal hydroxide or alkali metal carbonate or ammonium carbonate, and transition metal hydroxide (A) or transition metal carbonate (A) is precipitated, step (a). Thereafter, soluble compound(s) of titanium, zirconium, barium or aluminum are added, and optionally a water-soluble fluoride, for example sodium fluoride or ammonium fluoride, step (b). Simultaneously or subsequently, further aqueous solution of salts of transition metals selected from nickel, cobalt, manganese, iron, chromium and vanadium, and further precipitating reagent are added, step (c).

In embodiments in which a soluble barium compound is used to precipitate fluoride (B), hydroxide (B) or oxide (B), soluble salts of the transition metals are not selected from sulfates.

In embodiments in which it is desirable to produce transition metal hydroxide (A) or transition metal carbonate (A) also comprising M defined as Mg, at least one magnesium compound is also added, preferably a water-soluble magnesium compound, for example $MgSO_4$. The addition of magnesium compound can be effected, for example, during step (a) or step (c), or in a separate step.

In another embodiment, inventive particles are produced by a continuous process. For this purpose, the procedure may specifically be to use a stirred tank cascade having at least two stirred tanks. In the first stirred tank, transition metal hydroxide (A) or transition metal carbonate (A) is produced, specifically in the form of particles having a lower mean diameter than inventive particles, step (a). The particles thus formed are generally obtained as a suspension. This suspension is transferred to a second stirred tank containing an initial charge of, or with metered addition of, fluoride (B), hydroxide (B) or oxide (B) in the form of particles or in the form of a suspension, step (b), and additionally of aqueous solution of halides, nitrates, carboxylates, especially acetates, or most preferably sulfates of the transition metals in question, nickel, cobalt, manganese, iron, chromium and/or vanadium, and of further precipitating reagent, step (c).

In another specific embodiment, it is possible to proceed as follows. A stirred tank cascade having at least two stirred tanks is used. In the first stirred tank, transition metal hydroxide (A) or transition metal carbonate (A) is produced, specifically in the form of particles having a lower mean diameter than inventive particles, step (a). The particles thus formed are generally obtained as a suspension. This suspension is transferred to a second stirred tank containing an initial charge of, or with metered addition of, fluoride (B), hydroxide (B) or oxide (B) in the form of particles or in the form of a suspension, step (b). The suspension thus obtainable is transferred to a third stirred tank in which further aqueous solution of halides, nitrates, carboxylates, especially acetates, or most preferably sulfates of the transition metals in question, nickel, cobalt, manganese, iron, chromium and/or vanadium, and further precipitating reagent are added, step (c).

In another specific embodiment, it is possible to proceed as follows. A stirred tank cascade having at least two stirred tanks is used. In the first stirred tank, transition metal hydroxide (A) or transition metal carbonate (A) is produced, specifically in the form of particles having a lower mean diameter than inventive particles, step (a). The particles thus formed are generally obtained as a suspension. This suspension is transferred to a second stirred tank in which soluble compound(s) of titanium, zirconium, barium or aluminum are added, and optionally a water-soluble fluoride, for example sodium fluoride or ammonium fluoride, step (b), and additionally aqueous solution of halides, nitrates, carboxylates, especially acetates, or most preferably sulfates of the transition metals in question, nickel, cobalt, manganese, iron, chromium and/or vanadium, and further precipitating reagent, step (c).

In another specific embodiment, it is possible to proceed as follows. A stirred tank cascade having at least two stirred tanks is used. In the first stirred tank, transition metal hydroxide (A) or transition metal carbonate (A) is produced, specifically in the form of particles having a lower mean diameter than inventive particles, step (a). The particles thus formed are generally obtained as a suspension. This suspension is transferred to a second stirred tank in which soluble compound(s) of titanium, zirconium, barium or aluminum are added, and optionally a water-soluble fluoride, for example sodium fluoride or ammonium fluoride, step (b). The suspension thus obtainable is transferred to a third stirred tank in which further aqueous solution of halides, nitrates, carboxylates, especially acetates, or most preferably sulfates, of the transition metals in question, nickel, cobalt, manganese, iron, chromium and/or vanadium, and further precipitating reagent are added, step (c).

In embodiments in which it is desirable to produce transition metal hydroxide (A) or transition metal carbonate (A) also comprising M defined as Mg, at least one magnesium compound is also added, preferably a water-soluble magnesium compound, for example $MgSO_4$. Magnesium compound can be added at any point in the cascade.

In one embodiment of the present invention, the inventive process is performed at temperatures in the range from 10 to 85° C., preferably at temperatures in the range from 20 to 50° C.

In one embodiment of the present invention, the inventive process is performed at a pH in the range from 8 to 12, preferably 10.5 to 12.0, more preferably 11.3 to 11.9, each measured in the mother liquor at 23° C.

In one embodiment of the present invention, the inventive process is performed at a pressure in the range from 500 mbar to 20 bar, preferably standard pressure.

In one embodiment of the present invention, an excess of precipitant is used, for example alkali metal hydroxide or alkali metal carbonate, based on transition metal. The molar excess may, for example, be in the range from 1.1:1 to 100:1. It is preferable to work with a stoichiometric proportion of precipitant.

In one embodiment of the present invention, aqueous solution of alkali metal hydroxide has a concentration of alkali metal hydroxide in the range from 1 to 50% by weight, preferably 10 to 25% by weight. In another embodiment of the present invention, aqueous solution of alkali metal (hydrogen)carbonate has a concentration of alkali metal (hydrogen)carbonate in the range from 1% by weight up to a maximum of a saturated solution, up to 10% by weight in the case of $NaHCO_3$ and up to 21.5% by weight in the case of $Na_2CO_3$, in each case at 20° C., or more in the case of a correspondingly higher temperature.

In one embodiment of the present invention, the concentrations of aqueous solution of transition metal salts can be selected within wide ranges. Preferably, the concentrations are selected such that they are within the range of, in total, 1 to 1.8 mol of transition metal/kg of solution, more preferably 1.5 to 1.7 mol of transition metal/kg of solution.

In one embodiment of the present invention, the process according to the invention is performed in the presence of at least one compound L which may serve as a ligand for at least one of the transition metals, for example in the presence of at least one organic amine or especially of ammonia. In the context of the present invention, water should not be regarded as a ligand.

In one embodiment of the present invention, a concentration of L, especially of ammonia, within the range from 0.05 to 1 mol/l, preferably 0.1 to 0.7 mol/l, is selected. Particular preference is given to amounts of ammonia for which the solubility of $Ni^{2+}$ in the mother liquor is not more than 1000 ppm, more preferably not more than 500 ppm.

In one embodiment of the present invention, mixing is effected during the production of inventive particles, for example with a stirrer. Preference is given to introducing a stirrer output of at least 1 W/l into the reaction mixture, preferably at least 3 W/l and more preferably at least 5 W/l. In one embodiment of the present invention, a stirrer output of not more than 25 W/l can be introduced into the reaction mixture.

In a specific embodiment of the present invention, the procedure may be, in the case of batchwise process variants, to lower the stirrer output toward the end in batchwise operations.

In one embodiment of the present invention, mother liquor is drawn off during the performance of the inventive process.

The inventive process can be performed in the presence or absence of reducing agents. Examples of suitable reducing agents are hydrazine, ascorbic acid, glucose and alkali metal sulfites. It is preferable not to use any reducing agent.

The inventive process can be performed under air, under inert gas atmosphere, for example under noble gas or nitrogen atmosphere, or under reducing atmosphere. An example of a reducing gas is, for example, $SO_2$. Preference is given working under inert gas atmosphere.

After the actual production, inventive particles are removed from the mother liquor. The removal can be effected, for example, by filtration, centrifugation, decantation, spray drying or sedimentation, or by a combination of two or more of the aforementioned operations. Suitable apparatuses are, for example, filter presses, belt filters, spray dryers, hydrocyclones, inclined clarifiers or combinations of the aforementioned apparatuses.

Mother liquor refers to water, water-soluble salts and any further additives present in solution. Possible water-soluble salts are, for example, alkali metal salts of the counterions of transition metals, for example sodium acetate, potassium acetate, sodium sulfate, potassium sulfate, sodium nitrate, potassium nitrate, sodium halide, especially sodium chloride, potassium halide, and also additional salts, any additives used, and any excess alkali metal carbonate or alkali metal hydroxide, and also ligand L. In addition, the mother liquor may comprise traces of soluble transition metal salts.

In one embodiment of the present invention, mother liquor can be drawn off using an impact clarifier divided into two sections, in which not only precipitated particles but also gas bubbles introduced into the suspension by the stirring in the stirred vessel are removed.

After the actual removal, the inventive particles can be washed. Washing can be effected, for example, with pure water or with an aqueous solution of alkali metal carbonate or alkali metal hydroxide, especially with an aqueous solution of sodium carbonate, potassium carbonate, sodium hydroxide, potassium hydroxide or ammonia. Water and aqueous solution of alkali metal hydroxide, especially of sodium hydroxide, are preferred.

The washing can be effected, for example, with employment of elevated pressure or elevated temperature, for example 30 to 50° C. In another variant, the washing is performed at room temperature. The efficiency of the washing can be checked by analytical measures. For example, the content of transition metal(s) in the washing water can be analyzed.

If washing is effected with water rather than with an aqueous solution of alkali metal hydroxide, it is possible to check with the aid of conductivity studies on the washing water whether water-soluble substances, for example water-soluble salts, can still be washed out.

The removal of the inventive particles can be followed by drying. The drying can be performed, for example, with inert gas or with air. The drying can be performed, for example, at a temperature in the range from 30 to 150° C. If the drying is performed with air, it is observed in many cases that some transition metals are partially oxidized, for example $Mn^{2+}$ to $Mn^{4+}$ and $Co^{2+}$ to $Co^{3+}$, and blackening of the inventive particles is observed.

Inventive particles are of good suitability for conversion to cathode materials for lithium ion batteries. The present invention therefore further provides for the use of inventive particles for production of lithium-containing mixed transition metal oxides. The present invention further provides a process for producing lithium-containing mixed transition metal oxides using inventive particles, also called inventive process for short.

To perform the inventive process, the procedure may be, for example, to mix inventive particles with at least one lithium compound and to react them with one another at temperatures in the range from 500 to 1000° C.

The lithium compounds selected may preferably be lithium salts, for example $Li_2O$, $LiOH$, $LiNO_3$, $Li_2SO_4$, $LiCl$ or $Li_2CO_3$, each in anhydrous form or, if it exists, as the hydrate, preference being given to LiOH and particular preference to $Li_2CO_3$.

The amounts of inventive particles and lithium compound are selected so as to obtain the desired stoichiometry of the cathode material. Preferably, inventive particles and lithium compound are selected such that the molar ratio of lithium to the sum of all transition metals and any M is in the range from 1:1 to 1.4:1, preferably 1.01:1 to 1.1:1.

The reaction at 500 to 1000° C. can be performed in a furnace, for example in a rotary tube furnace, in a muffle furnace, in a pendulum furnace, in a roller hearth furnace or in a push-through furnace. Combinations of two or more of the aforementioned furnaces are also possible.

The reaction at 500 to 1000° C. can be performed over a period of 30 minutes to 24 hours. Reaction can be effected at one temperature or a temperature profile can be run.

The performance of the inventive process affords lithium-containing mixed transition metal oxides which likewise form part of the subject matter of the present invention.

The present invention particularly provides lithium-containing mixed transition metal oxides in particulate form, also called inventive mixed oxides for short. Inventive mixed oxides comprise (C) at least one mixed oxide of lithium and at least 3 different transition metals selected from nickel, cobalt, manganese, iron, chromium and vanadium, also called oxide (C) for short, and (D) at least one fluoride or oxide of Ba, Al, Zr or Ti, where fluoride (D) or oxide (D) is present to an extent of at least 75% in an outer shell of the particles in the form of domains and is encased to an extent of at least 90% by oxide (C).

Inventive mixed oxides are in the form of spherical particles. Spherical particles—as is also the case for the inventive particles—shall include not just those particles which are exactly spherical but also those particles for which the maximum and minimum diameter of at least 95% (number average) of a representative sample differ by not more than 5%.

It is observed that the mobility of the transition metal ions selected from ions of nickel, cobalt, manganese, iron, chromium and vanadium within the particles is extremely low during the inventive process depending on temperature. In contrast, ions of Ba, Al, Zr or Ti can migrate or diffuse during the performance of the inventive process. Thus, the statements made with regard to shells, domains and homogeneity of the composition in connection with inventive particles may apply correspondingly to inventive mixed oxides. If, in contrast, treatment is effected at 950 to 1000° C. for more than 12 hours, it is generally found that the ions of Ba, Al, Zr or Ti are distributed homogeneously over the cross section of the particles of mixed oxide in question.

In one embodiment of the present invention, particles of inventive mixed oxide are present in the form of agglomerates of primary particles. The primary particles may have, for example, a mean diameter in the range from 10 nm to 500 nm.

Particles of inventive mixed oxide may have a median diameter (D50) in the range from 0.1 to 35 µm, preferably 2 to 30 µm, for example measured by light scattering. Suitable instruments are commercially available, for example Malvern Mastersizer.

The width of the particle diameter distribution is preferably narrow. In one embodiment of the present invention, for particles of inventive mixed oxide, (D10)≥3 µm and (D90)<30 µm. In a specific embodiment of the present invention, in addition: 3·(D10)≥(D50) and (D90)≤2·(D50). More preferably, 2·(D10)≥(D50) and (D90)≤1.5·(D50).

The present invention further provides for the use of inventive mixed oxide as or for production of cathode material for lithium ion batteries.

Cathode material may, as well as inventive mixed oxide, comprise carbon in an electrically conductive polymorph, for example as carbon black, graphite, graphene, carbon nanotubes or activated carbon.

Cathode material may further comprise at least one binder, for example a polymeric binder.

Suitable binders are preferably selected from organic (co)polymers. Suitable (co)polymers, i.e. homopolymers or copolymers, may be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

Polyacrylonitrile is understood in the context of the present invention to mean not only polyacrylonitrile homopolymers but also copolymers of acrylonitrile with 1,3-butadiene or styrene. Preference is given to polyacrylonitrile homopolymers.

In the context of the present invention, polyethylene is understood to mean not only homopolyethylene but also copolymers of ethylene which comprise at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not only homopolypropylene but also copolymers of propylene which comprise at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not only homopolymers of styrene but also copolymers with acrylonitrile, 1,3-butadiene, (meth) acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binders are selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a particularly preferred embodiment of the present invention, binders are selected from halogenated (co)polymers, especially from fluorinated (co)polymers. Halogenated or fluorinated (co)polymers are understood to mean those (co)polymers comprising, in copolymerized form, at least one (co)monomer having at least one halogen atom or at least one fluorine atom per molecule, preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylenetetrafluoroethylene copolymers, vinylidene fluoride-chlorotrifluoroethylene copolymers and ethylenechlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene. Electrically conductive carbonaceous material can be selected, for example, from graphite, carbon black, carbon nanotubes, graphene and mixtures of at least two of the aforementioned substances. In the context of the present invention, electrically conductive carbonaceous material can also be referred to as carbon (B) for short.

In one embodiment of the present invention, electrically conductive carbonaceous material is carbon black. Carbon black may be selected, for example, from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, electrically conductive carbonaceous material is partially oxidized carbon black.

In one embodiment of the present invention, electrically conductive carbonaceous material comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

In the context of the present invention, graphene is understood to mean almost ideally or ideally two-dimensional hexagonal carbon crystals of analogous structure to individual graphite layers.

In one embodiment of the present invention, the weight ratio of inventive modified mixed transition metal oxide and electrically conductive carbonaceous material is 200:1 to 5:1, preferably 100:1 to 10:1.

A further aspect of the present invention is a cathode comprising at least one mixed transition metal oxide as produced above, at least one electrically conductive carbonaceous material and at least one binder.

Inventive mixed oxide and electrically conductive carbonaceous material have been described above.

The present invention further provides electrochemical cells produced using at least one inventive cathode. The present invention further provides electrochemical cells comprising at least one inventive cathode.

In one embodiment of the present invention, cathode material produced in accordance with the invention comprises:
in the range from 60 to 98% by weight, preferably 70 to 96% by weight, of inventive mixed oxide,
in the range from 1 to 20% by weight, preferably 2 to 15% by weight, of binder,
in the range from 1 to 25% by weight, preferably 2 to 20% by weight, of electrically conductive carbonaceous material.

The geometry of inventive cathodes can be selected within wide limits. It is preferable to configure inventive cathodes in thin films, for example in films with a thickness in the range from 10 µm to 250 µm, preferably 20 to 130 µm.

In one embodiment of the present invention, inventive cathodes comprise a foil or film, for example a metal foil, especially an aluminum foil, or a polymer film, for example a polyester film, which may be untreated or siliconized.

The present invention further provides for the use of inventive cathode materials or inventive cathodes in electrochemical cells. The present invention further provides a process for producing electrochemical cells using inventive cathode material or inventive cathodes. The present invention further provides electrochemical cells comprising at least one inventive cathode material or at least one inventive cathode.

Inventive electrochemical cells comprise a counterelectrode which, in the context of the present invention, is defined as the anode and which may, for example, be a carbon anode, especially a graphite anode, a lithium anode, a silicon anode or a lithium titanate anode.

Inventive electrochemical cells may, for example, be batteries or accumulators.

Inventive electrochemical cells may, as well as anode and inventive cathode, comprise further constituents, for example conductive salt, nonaqueous solvent, separator, output conductor, for example made of a metal or an alloy, and also cable connections and housing.

In one embodiment of the present invention, inventive electrical cells comprise at least one nonaqueous solvent which may be liquid or solid at room temperature, preferably selected from polymers, cyclic or noncyclic ethers, cyclic and noncyclic acetals, and cyclic or noncyclic organic carbonates.

Examples of suitable polymers are especially polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably doubly methyl- or ethyl-capped polyalkylene glycols.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (III) and (IV)

(III)

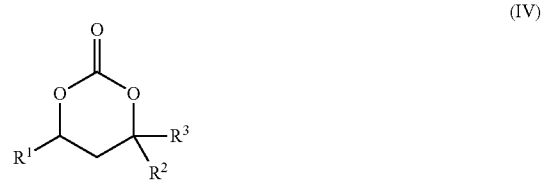

(IV)

in which $R^1$, $R^2$ and $R^3$ may be the same or different and are each selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

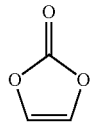
(V)

Preference is given to using the solvent(s) in what is called the anhydrous state, i.e. with a water content in the range from 1 ppm to 0.1% by weight, determinable, for example, by Karl Fischer titration.

Inventive electrochemical cells further comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$ where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_tYLi$ where t is defined as follows:
t=1 when Y is selected from oxygen and sulfur,
t=2 when Y is selected from nitrogen and phosphorus, and
t=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

In one embodiment of the present invention, inventive electrochemical cells comprise one or more separators by which the electrodes are mechanically separated from one another. Suitable separators are polymer films, especially porous polymer films, which are unreactive toward metallic lithium. Particularly suitable materials for separators are polyolefins, especially porous polyethylene films and porous polypropylene films.

Polyolefin separators, especially of polyethylene or polypropylene, may have a porosity in the range from 35 to 45%. Suitable pore diameters are, for example, in the range from 30 to 500 nm.

In another embodiment of the present invention, separators may be selected from PET nonwovens filled with inorganic particles. Such separators may have a porosity in the range from 40 to 55%. Suitable pore diameters are, for example, in the range from 80 to 750 nm.

Inventive electrochemical cells further comprise a housing which may be of any shape, for example cuboidal or in the shape of a flat cylinder. In one variant, the housing used is a metal foil elaborated as a pouch.

Inventive electrochemical cells give a high voltage and are notable for high energy density and good stability. It is found that, in inventive electrochemical cells, there is only a low concentration of HF in the electrolyte.

Inventive electrochemical cells can be combined with one another, for example in series connection or in parallel connection. Series connection is preferred.

The present invention further provides for the use of inventive electrochemical cells in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The use of inventive electrochemical cells in devices offers the advantage of a longer operating time prior to recharging. If the intention were to achieve an equal run time with electrochemical cells with lower energy density, a higher weight for electrochemical cells would have to be accepted.

The invention is illustrated further by working examples.
General remarks: liters are understood to mean standard liters unless stated otherwise. Percentages in the context of the present invention are % by weight, unless explicitly stated otherwise.

I. PRODUCTION EXAMPLES

Figures in % relate to percent by weight, unless explicitly stated otherwise.

The examples and comparative examples were conducted in a reactor system having a total volume of 8 l, and the reactor system included a stirred tank having a volume of 7 l and a solid/liquid separation apparatus having a volume of 1 l. Using the separation apparatus, it was possible during the production of inventive particles to draw off mother liquor from the stirred tank by means of a pump without simultaneously withdrawing particles.

The reactor system was equipped with a pitched-blade stirrer and baffles. The stirrer power was measured by means of an electric motor with torque measurement from speed and torque. In addition, the reactor system had a plurality of metering units with metering pumps, and also a cathode for pH measurement and a temperature sensor.

I.1 Production of Transition Metal Hydroxide TH.1

First of all, the reactor system was filled with 8 l of ammonium sulfate solution (36 g $(NH_4)_2SO_4$/l) and heated to 45° C.

The contents of the stirred tank were mixed continuously, and mechanical work of about 45 watts was performed on the contents. The specific power input in the stirred tank was thus about 6.4 watts per liter. In the separation apparatus, no stirrer power was introduced.

Additionally present in the stirred tank was a fill level sensor which regulated the discharge pump at the liquid-side connection of the separation apparatus such that the level in the stirred tank remained essentially constant. Solids were recycled from the separation apparatus back into the reactor.

The gas space in the reactor system, about 2 liters, was purged with 40 l/h of nitrogen during the performance of the precipitation.

The following aqueous solutions were used:
Solution A: 0.825 mol per kg of solution of nickel sulfate, 0.33 mol per kg of solution of cobalt sulfate, and 0.495 mol per kg of solution of manganese sulfate, prepared by dissolving the corresponding hydrate complexes in water.
Solution B: 5.59 mol of NaOH per kg of solution and 1.55 mol of $NH_3$ per kg of solution. Prepared from 25% NaOH and 25% ammonia solution.
Solution C: 6.25 mol of NaOH per kg of solution.
Solution D: 11.8 g of aluminum as sodium aluminate (technical grade sodium aluminate), dissolved in 1.15 kg of water at about 50° C., pH 14.

Solutions A and B were metered into the stirred tank by means of metering pumps; solution C was metered in such that the pH in the stirred tank remains constant (pH regulation). Solution D was metered in with a peristaltic pump. Ultrafine aluminum hydroxide particles formed from solution D in the course of introduction under process conditions.

Experimental Procedure

On attainment of reaction temperature (45° C.), the ammonium sulfate solution was adjusted to pH 11.82, measured at 23° C., by adding solution C. Then metering pumps were used to meter solutions A and B at constant mass flow rate (957/521 g/h) into the turbulent zone close to the stirrer blades of the stirred tank of the reactor system. By means of a regulating device, the pH was kept constant at 11.8 (measured at 23° C.) by means of addition of solution C. This formed a suspension. After 20.5 hours, suspension D was additionally metered in (addition approx. 0.18 l/h). After 6 hours, solution D was consumed. Thereafter, the mixture was stirred without feeding for 15 min.

This gave a suspension of transition metal hydroxide which had a molar Ni:Co:Mn ratio of 5:2:3. The suspension was filtered through a suction filter, and the filtercake was washed with water and dried at 105° C. under air over a period of 18 hours. The inventive particles thus obtainable had a composition of 31.0% by weight of nickel, 12.5% by weight of cobalt and 17.2% by weight of manganese, each in the form of the hydroxides, and were in partly oxidized form. 3.6 kg of inventive particles were obtained. The aluminum content was determined by atomic spectroscopy (ICP-OES) and was 0.29%. The inventive particles were sieved (mesh size 32 μm; coarse material: 0.1%) and the tamped density was determined (1.97 kg/l). An aliquot was suspended in water and the particle diameters were determined by light scattering (Malvern Mastersizer 2000). The median particle diameter D50 was 10.6 μm, with a narrow particle size distribution (D10=7.8 μm; D90=14.5 μm).

The thickness of the outer shell of inventive particles was 0.5 to 0.6 μm and the core diameter was about 9.6 to 9.8 μm. In scanning electron micrographs, domains of aluminum oxide were evident, which had a diameter in the range from about 10 to 100 nm and which were exclusively in the outer shell. The domains of aluminum oxide were completely encased by nickel-cobalt-manganese hydroxide.

II.1 Method for Production of Inventive Spherical Particles General Method Using the Example of TH.1:

TH.1 was mixed intimately with ground lithium carbonate, and the molar ratio of lithium to the sum of the transition metals in TH.1 was 1.10. A portion (40 g) of this mixture was treated thermally in rectangular crucibles made from sintered alumina in a muffle furnace (air atmosphere; maximum temperature: 900° C.; heating rate 3 K/min; hold points at 300° C. and 600° C.; hold time in each stage: 6 hours). After cooling to room temperature, the calcined material was triturated in a mortar and sieved (mesh size 32 μm; no coarse material). About 30 g of inventive spherical particles SP.1 were obtained as virtually agglomerate-free powder. This was processable to give the inventive electrodes.

II.2 Production of Alumina-Containing Comparative Material C-SP.2

In a modification of the method given under 11.1, commercially available spherical metal hydroxide (Ni:Co:Mn=5:2:3) and aluminum hydroxide powder (2 mol % of Al based on the sum of the transition metals; D50 1.8 μm; 99.4% Al(OH)$_3$) were mixed. A roller mixer was used for mixing (80 rpm, 1 hour, 30 g of agate balls—diameter 10 mm, batch size 30 g of powder). Then ground lithium carbonate was added analogously to 11.1, the mixture was mixed for a further 5 hours, and the procedure was otherwise as described in 11.1. About 30 g of comparative particles C-SP.2 were obtained (aluminum content comparable to SP.1).

II.3 Production of Alumina-Containing Comparative Material C-SP.3

Analogously, comparative particles C-SP.3 were obtained using 5 mol % of aluminum hydroxide.

III. GENERAL METHOD FOR PRODUCTION OF INVENTIVE ELECTRODES AND INVENTIVE ELECTROCHEMICAL CELLS

Materials Used:

Binder (BM 1): Polymer of vinylidene fluoride, as a solution, 10% by weight in NMP. Powder commercially available as KynarFlex® 2801 from Arkema, Inc.

Electrically conductive carbonaceous materials:

Carbon 1: carbon black, BET surface area of about 60 m$^2$/g, commercially available as "Super C65" from Timcal Carbon 2: graphite, commercially available as "KS6" from Timcal General Method Using the Example of Inventive Particles (SP.1):

0.661 g of carbon 1, 0.661 g of carbon 2 and 13.21 g of binder (BM.1) were mixed with addition of 10.02 g of N-methylpyrrolidone (NMP) to give a paste. In a next step, 4.99 g of this paste were mixed with 4.00 g of inventive particles (SP.1). An aluminum foil of thickness 30 μm was coated with the above-described paste (active material loading about 9 mg/cm$^2$). After drying at 105° C., circular parts of the aluminum foil thus coated (diameter 19.8 mm) were punched out. The electrodes thus obtainable were used to produce inventive electrochemical cells EC.1. The electrolyte used was a 1 mol/l solution of LiPF$_6$ in ethylene carbonate/dimethyl carbonate (1:1 based on parts by mass). The anode consisted of a lithium foil which was separated from the cathode by a separator made from glass fiber paper.

Subsequently, the cells were assembled at room temperature and cycled at 25° C. The cycling current was 150 A/kg, based on the active material of the cathode, and in the first few cycles the rate capability was also determined at currents up to 975 A/kg. The voltage range selected was 3.0 volts to 4.3 volts.

The charging was conducted at 150 A/kg until the upper switch-off voltage had been attained, then charging was effected at constant voltage for another 30 minutes. Discharging was always conducted only until the lower switch-off voltage had been attained.

The capacities of cycles 40 and 80 are reported in Table 1. Proceeding from these data, the capacity drop for 100 cycles was calculated, corresponding to 2.5 times the drop from cycle 40 to cycle 80.

The comparative cells were produced analogously.

EC.1: Cell comprises inventive material.

C-EC.2: Cell comprises comparative material C-SP.2.

C-EC.3: Cell comprises comparative material C-SP.3.

TABLE 1

Capacity and capacity drop (discharge, A · h/kg) of inventive electrochemical cells and comparative cells

| Cycle | EC.1 | C-EC.2 | C-EC.3 |
|---|---|---|---|
| 40 | 153.6 | 146.1 | 143.7 |
| 80 | 150.2 | 141.7 | 140.3 |
| Capacity drop | 8.4 | 10.8 | 8.7 |

The invention claimed is:

1. Spherical particles, comprising
   (A) a mixed transition metal hydroxide or mixed transition metal carbonate of at least 3 different transition metals selected from the group consisting of nickel, cobalt, manganese, iron, chromium and vanadium; and
   (B) a fluoride, oxide or hydroxide of Ba, Al, Zr or Ti,
   wherein the transition metals in transition metal hydroxide (A) or transition metal carbonate (A) are predominantly in the +2 oxidation state, and
   wherein fluoride (B) or oxide (B) or hydroxide (B) is present to an extent of at least 75% in an outer shell of the spherical particles in the form of domains and is encased to an extent of at least 90% by transition metal hydroxide (A) or transition metal carbonate (A).

2. The spherical particles according to claim 1, wherein one or more transition metals in transition metal hydroxide (A) or transition metal carbonate (A) are at least partially present in the +3 or +4 oxidation state.

3. The spherical particles according to claim 1, wherein oxide (B) is selected from the group consisting of $BaTiO_3$, $Al_2O_3$ and $TiO_2$.

4. The spherical particles according to claim 1, having a median diameter (D50) in the range from 2 to 30 μm.

5. The spherical particles according to claim 1, wherein the outer shell has a mean thickness of 1 to 15%, based on a diameter of the respective particle.

6. The spherical particles according to claim 1, wherein the mixed transition metal hydroxide (A) is of formula (I):

$$Ni_aCo_bMn_cM_dO_e(OH)_f \quad (I)$$

wherein
   M is Mg and/or at least one transition metal selected from the group consisting of Fe, Cr and V
   a is from 0.1 to 0.8,
   b is from 0.1 to 0.4,
   c is from 0.1 to 0.6,
   d is from zero to 0.2,
   where: a+b+c+d=1,
   e is from 0.05 to 0.5,
   f is from 0.5 to 1.9,
   and a mean oxidation state of Ni, Co and Mn is from 2.1 to 3.2.

7. The spherical particles according to claim 1, wherein the mixed transition metal carbonate (A) is of formula (II):

$$Ni_{a'}Co_{b'}Mn_{c'}M_{d'}O_{e'}(OH)_j(CO_3)_h \quad (II)$$

wherein
   M is at least one transition metal selected from the group consisting of Fe, Cr and v,
   a' is from 0.1 to 0.5,
   b' is from zero to 0.3,
   c' is from 0.1 to 0.75,
   d' is from zero to 0.2,
   where: a'+b'+c'+d'=1,
   e' is from zero to 0.6,
   h is from 0.4 to 1, and
   j is from zero to 0.3.

8. The spherical particles according to claim 1, wherein the spherical particles are of inhomogeneous composition, a mean standard deviation of the composition of nickel, cobalt and manganese being up to 10 mol % in each case.

9. The spherical particles according to claim 1, wherein the proportion of fluoride (B) or oxide (B) or hydroxide (B) is from 0.3 to 5% by weight, based on transition metal hydroxide (A) or transition metal carbonate (A).

10. A process for producing spherical particles according to claim 1, the process comprising:
    (a) first producing particles of transition metal hydroxide (A) or transition metal carbonate (A);
    (b) contacting fluoride (B) or oxide (B) or hydroxide (B) or a solution comprising a salt of Ba, Al, Zr or Ti and optionally a water-soluble fluoride with the particles of transition metal hydroxide (A) or transition metal carbonate (A) obtained in the producing (a), at a different time or reaction vessel from the producing (a); and
    (c) producing a further transition metal hydroxide (A) or transition metal carbonate (A) and combining the transition metal hydroxide (A) or transition metal carbonate (A) obtained with the particles obtained in the producing (a),
    wherein steps (b) and (c) may run simultaneously or consecutively.

11. The spherical particles according to claim 1, wherein the spherical particles are suitable for production of lithium-containing mixed transition metal oxides.

12. A process for producing lithium-containing mixed transition metal oxides, comprising mixing spherical particles according to claim 1 with a lithium compound and reacting them with one another at temperatures in the range from 500 to 1000° C.

13. A lithium-containing mixed transition metal oxide in particulate form, comprising
    (C) a mixed oxide of lithium and at least 3 different transition metals selected from the group consisting of nickel, cobalt, manganese, iron, chromium and vanadium,
    (D) a fluoride or oxide of Ba, Al, Zr or Ti,
    wherein fluoride (D) or oxide (D) is present to an extent of at least 75% in an outer shell of the particles in the form of domains and is encased to an extent of at least 90% by oxide (C).

14. The lithium-containing mixed transition metal oxide according to claim 13, wherein the lithium-containing mixed transition metal oxide is suitable for production of cathode material for lithium ion batteries.

* * * * *